Sept. 28, 1943.　　　H. T. TORNBERG　　　2,330,319
VULCANIZER
Filed March 14, 1941　　　7 Sheets-Sheet 1

INVENTOR.
Henning T. Tornberg
BY J. Ralph Barrow

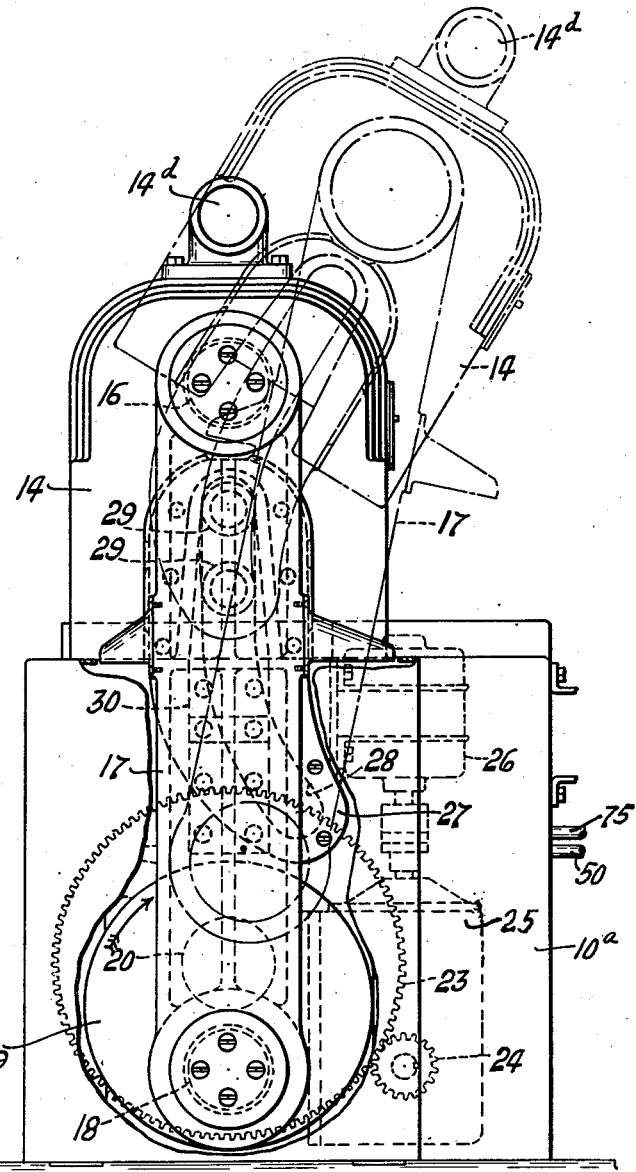
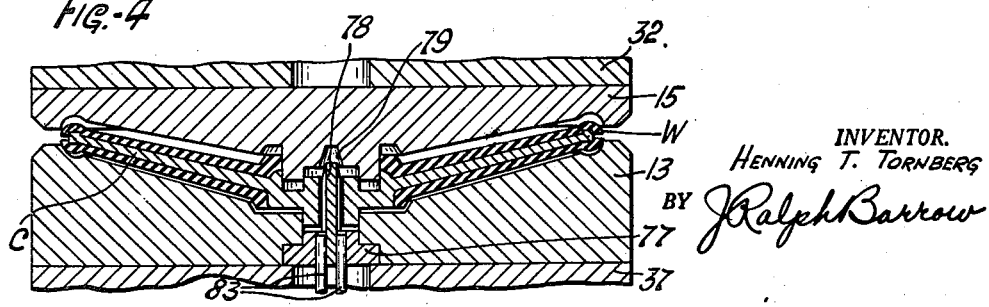

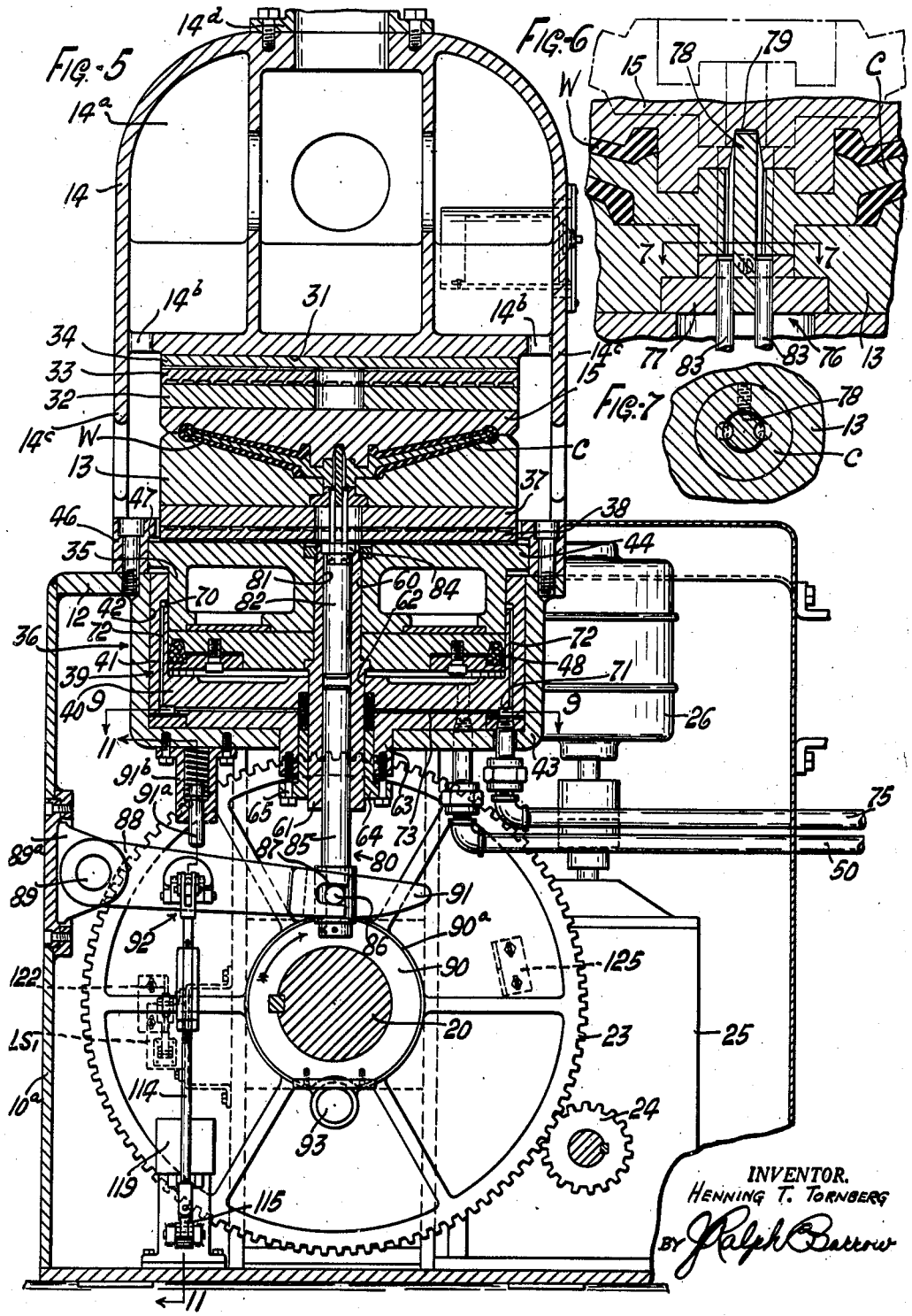

Sept. 28, 1943.    H. T. TORNBERG    2,330,319
VULCANIZER
Filed March 14, 1941    7 Sheets-Sheet 4
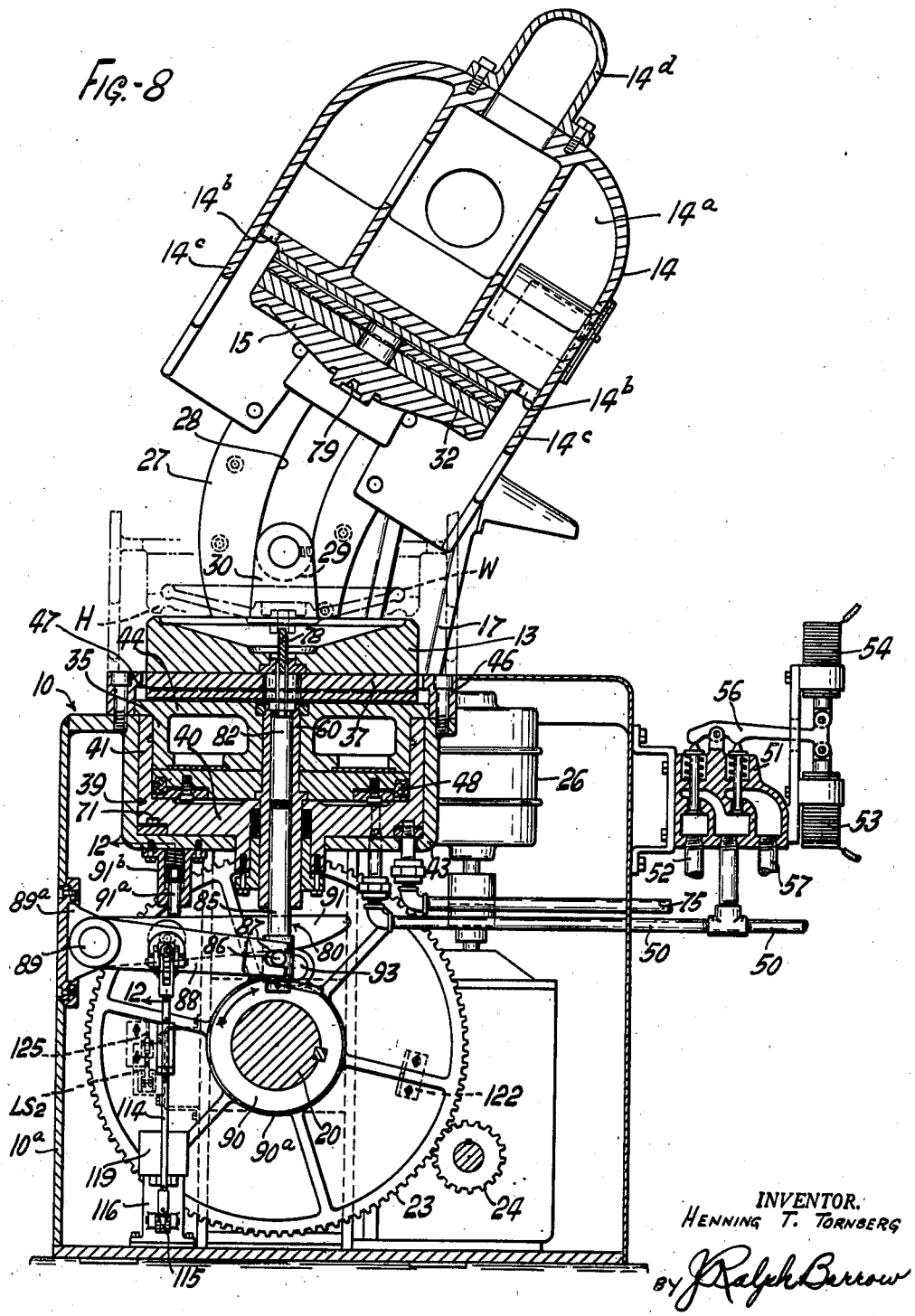

Sept. 28, 1943. H. T. TORNBERG 2,330,319
VULCANIZER
Filed March 14, 1941 7 Sheets-Sheet 5

INVENTOR.
HENNING T. TORNBERG
By Ralph Burrow

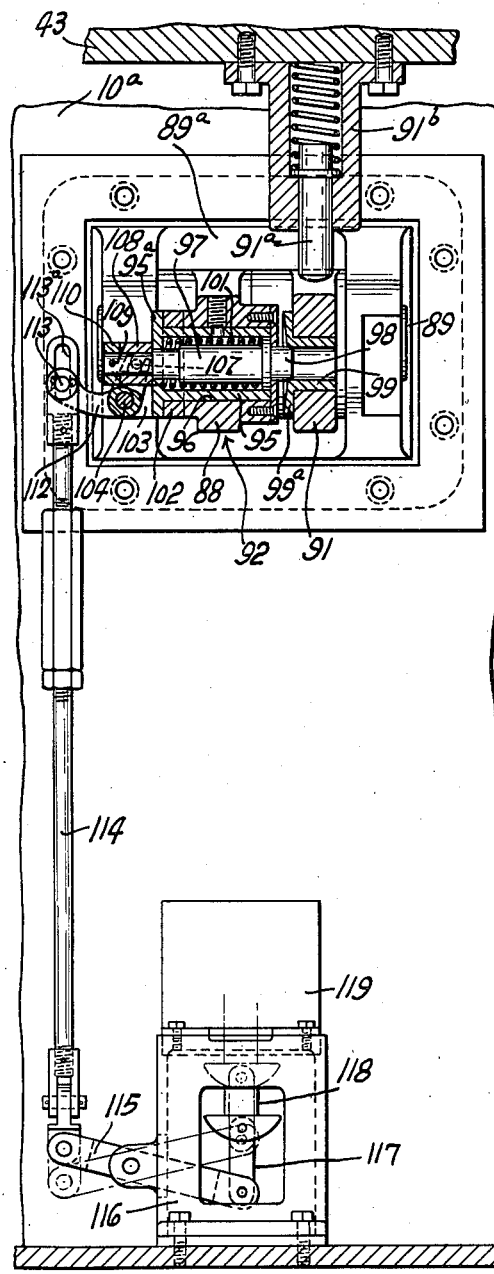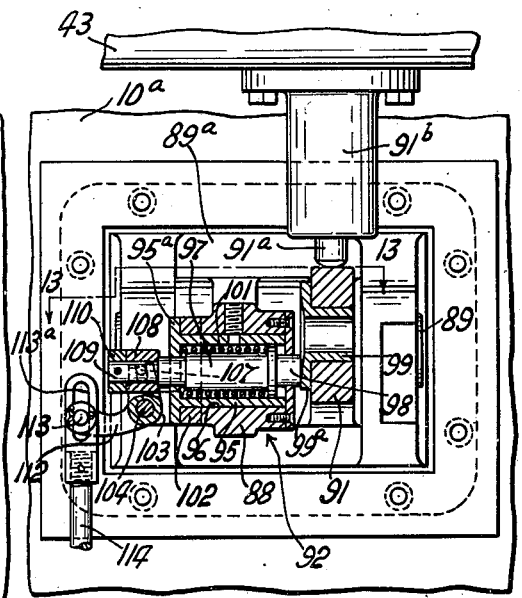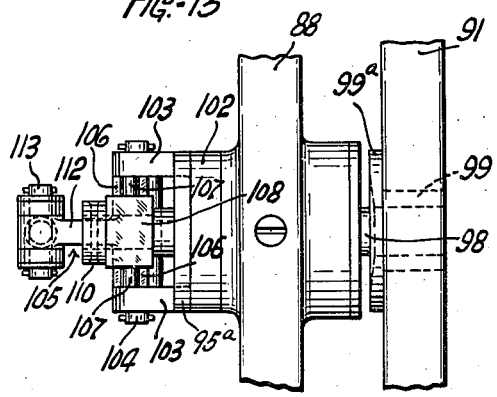

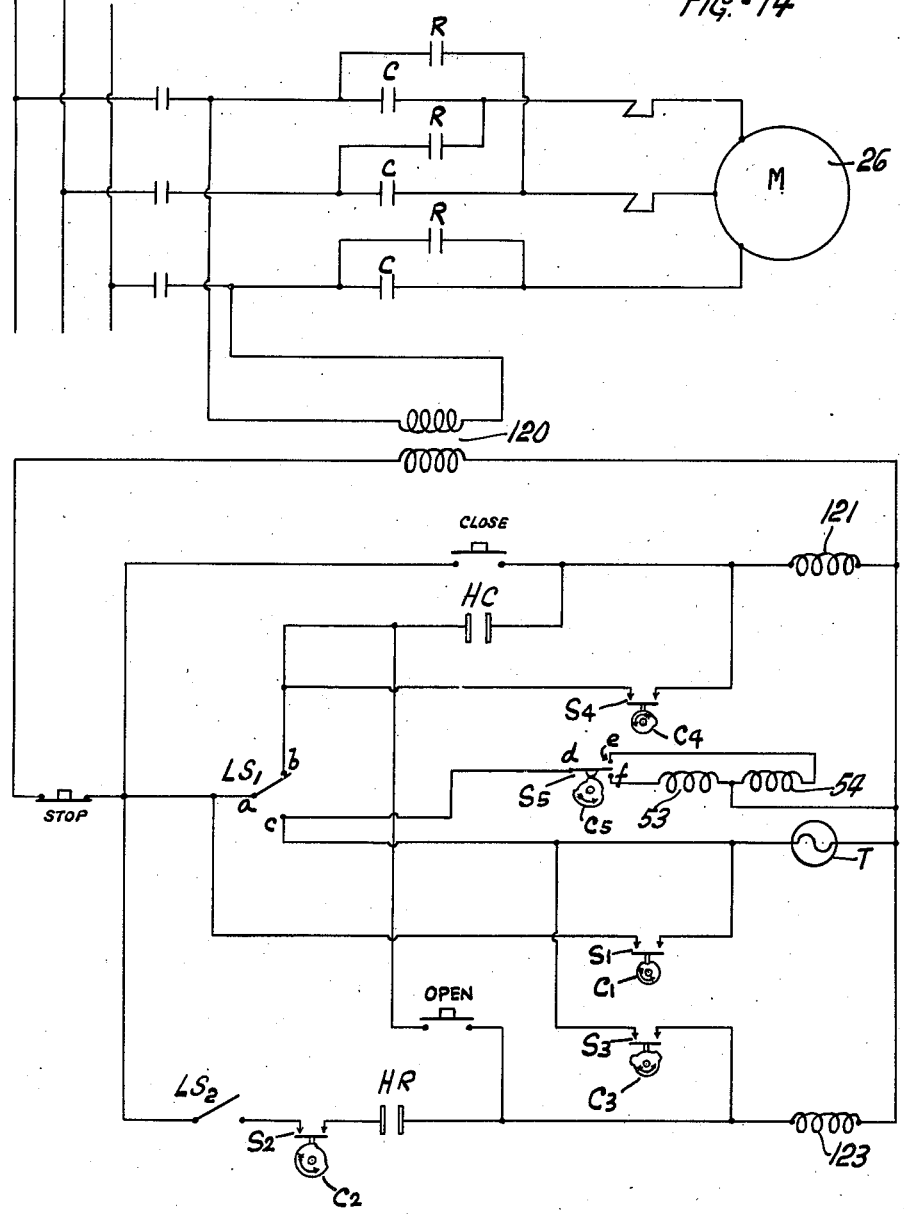

Patented Sept. 28, 1943

2,330,319

UNITED STATES PATENT OFFICE 2,330,319

VULCANIZER

Henning T. Tornberg, Akron, Ohio, assignor to National Rubber Machinery Co., Akron, Ohio, a corporation of Ohio Application March 14, 1941, Serial No. 383,315

2 Claims. (Cl. 18—17)

This invention relates to vulcanizing presses, and in particular relates to vulcanizing presses for manufacturing hard rubber or like articles, such as vehicle steering wheels.

In the manufacture of hard rubber articles of the character described, certain volatile pigments used in the rubber generate gases in the heat of vulcanization. If these gases are not expelled from between the mold sections of the press before they are fully closed for the curing cycle, gas pockets in the mold cavities will cause the articles to be non-uniform in shape, or formed with imperfections, such as flat portions or depressions.

In the past, expansible diaphragms or bags of known type have been used to apply a final "squeeze" pressure between registering mold sections upon closing a vulcanizing press, to allow for slack in the press operating mechanism and insure full engagement of the contacting surfaces of said registering sections. Such diaphragms, however, have been limited as to the pressure obtainable, and as to the amount of slack which may be taken up. Hydraulic rams for this purpose also have been objectionable in the past, because no satisfactory means has been devised prior to the present invention for preventing loss of pressure fluid, such as oil, from between the relatively movable parts of the ram.

An object of the invention is to provide an improved press of the character described including mating mold sections and means for relatively moving the sections toward substantially mating relation, the press having yielding, self-centering means for applying article-forming pressure between the mating mold sections.

Another object of this invention is to provide a press of the class described having provision for expelling gases from between the mating mold sections thereof, prior to the curing cycle, whereby articles formed in the mold cavities will be of uniform shape, and whereby imperfections caused by gas pockets will be obviated.

Another object of the invention is to provide in a press of the character described improved means for conveying gases from between the mold sections to prevent escape thereof outwardly of the press.

Another object of the invention is to provide in a press of the class described improved ejector means for automatically stripping and ejecting the finished product from a mold cavity thereof, with power-operated means for operating the ejecting means so that said mold cavity will be free and unobstructed to permit free insertion therein of a preformed or unvulcanized article for a succeeding vulcanizing cycle.

Still another object of the invention is to provide a press of the character described, including an automatically operable hydraulic ram for applying the article-forming pressure between the mold sections after the press is closed for a vulcanizing cycle, with means provided to recover or prevent loss of pressure fluid from between relatively movable parts of the ram.

These and other objects of the invention will be manifest from the following brief description and the accompanying drawings.

Of the accompanying drawings:

Figure 3 is a side elevation, partly broken away, of the press as viewed from the right of Figure 1.

Figure 4 is an enlarged fragmentary cross-section taken substantially on line 4—4 of Figure 1, but with the mold sections shown in intermediate closing positions with respect to each other.

Figure 5 is an enlarged cross-section taken substantially on line 5—5 of Figure 1.

Figure 6 is an enlarged fragmentary cross-section illustrating the upper portion of the ejector mechanism in association with the mold sections as viewed in Figure 5.

Figure 7 is a fragmentary cross-section taken on line 7—7 of Figure 6.

Figure 8 is a view similar to Figure 5, but on a reduced scale, illustrating the press in fully open position.

Figure 11 is an enlarged cross-sectional view taken substantially on line 11—11 of Figure 5, illustrating the ejector operating and latching mechanism.

Figure 12 is an enlarged cross-section taken substantially on line 12—12 of Figure 8.

Figure 13 is an enlarged fragmentary view taken substantially on line 13—13 of Figure 12.

Figure 14 is a schematic wiring diagram illustrating the electrical connections for operating the press.

Figure 1:
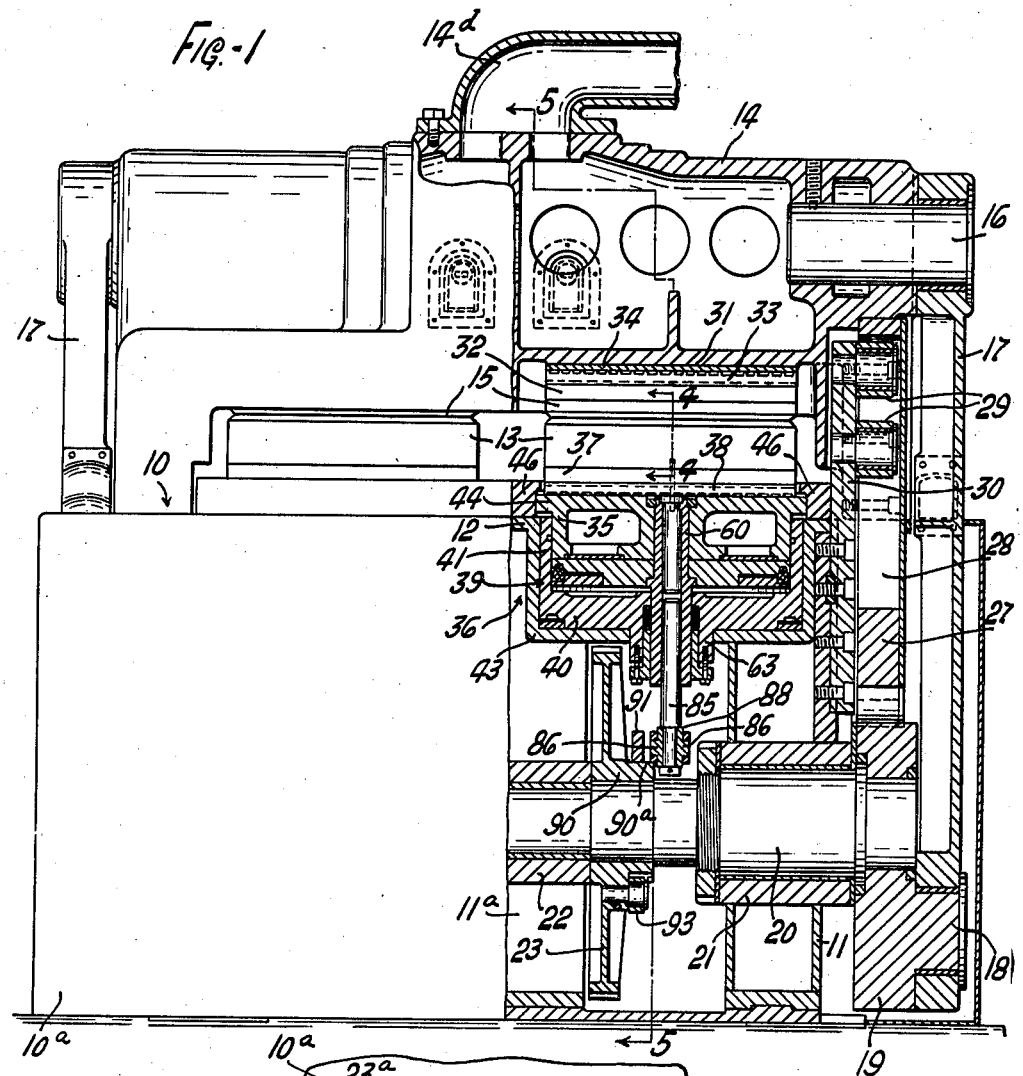
Figure 1 is a front elevation, partly broken away and in section, of a vulcanizing press embodying the present invention, the same being illustrated in fully closed position.

Referring particularly to Figures 1 to 8 of the drawings, the numeral 10 designates a lower press member comprising end and center uprights, 11 and 11a respectively, fixedly supporting a platen 12 on which there is mounted, in a manner subsequently to be described, one or more lower mold sections 13, 13. The lower press member is enclosed in a suitable casing or housing 10a. Arranged above the press member 10 may be a relatively movable press member or head 14, carrying upper mold sections 15, 15 for registering with the lower sections 13 when the head is relatively moved toward said member 10. The lower sections, broadly speaking, are considered as being relatively fixed with respect to the general opening and closing movements of the press, but are vertically movable in a manner to be described after the press head is in closed position.

The head 14 may be moved in parallelism from and toward a closed position of the press in which the registering faces of the respective mold sections 13 and 15 are in slightly spaced relation, as will be later described, and from and toward a rearwardly tilted position when the press is opened (see chain dotted lines in Figure 3). For this purpose, the upper press member is pivotally supported on pins 16, secured in opposite ends thereof, between a pair of side arms 17, 17 which extend downwardly, straddling lower press member 10, these arms being pivotally connected at the lower ends thereof to pins 18 of crank members 19 which are suitably keyed on a shaft 20 journalled in bearings 21 and 22 in uprights 11 and 11a, respectively. The shaft 20 is driven by a pair of gears 23, 23a keyed thereon engaging pinions 24, which in turn are driven through a suitable reduction gearing 25 by a reversing motor 26.

Means for controlling the angular movements of head 14 in the manner described is best shown in Figures 1, 3 and 8. Cam plates 27 are suitably secured adjacent opposite ends of movable head 14 inwardly of arms 17, these plates each having a cam slot 28 therein for receiving a pair of spaced rollers 29, 29, which are mounted on a plate 30 fixedly secured to the lower press member 10. These spaced rollers engage along a substantial length of the cam slot 28 to restrain a cam plate 27 against relative pivotal movement at any given position of the rollers therein, except as the cam plate is allowed to assume various annular positions with respect to fixed plate 30, determined by the direction of the cam slot at various points during the opening and closing of the press. In the present instance the cam slot 28 is shaped and directed so that the head 14 will move in parallelism from and toward the closed position thereof with respect to the lower press member 10, and so that as the head moves toward the fully open position the side arms 17 will be permitted to tilt rearwardly on the crank pins 18, thereby allowing the head 14 to tilt rearwardly, as restrained by the cam plate and the spaced rollers, to permit free access to the lower mold cavity (see Figure 8).

Interposed between the upper mold section 15 and a bottom wall or plate 31 of head 14 may be an electrically heated plate 32 for heating said mold section, removable and replaceable heat insulating spacer plates 33 and 34 being provided between the heating plate and wall 31 of the head.

In order to insure complete registry of the respective pairs of mold sections when the press is closed by the press-operating mechanism described above, each lower mold section 13 is mounted on the upper end of a vertically shiftable piston 35 of a hydraulic ram, indicated generally at 36, the ram being automatically operable to apply article-forming pressure between the upper and lower mold sections after the upper press member 14 has moved to closed position. Between the piston 35 and section 13 may be an electrical heating plate 37 similar to plate 32, and a removable and replaceable, heat-insulating spacer plate 38. Piston 35 is vertically slidable in a cylinder 39, the latter including a bottom wall 40 and an annular side wall 41, this cylinder being fixedly received in a recess 42 of a cup-shaped portion 43 formed in the platen 12.

Figure 10:
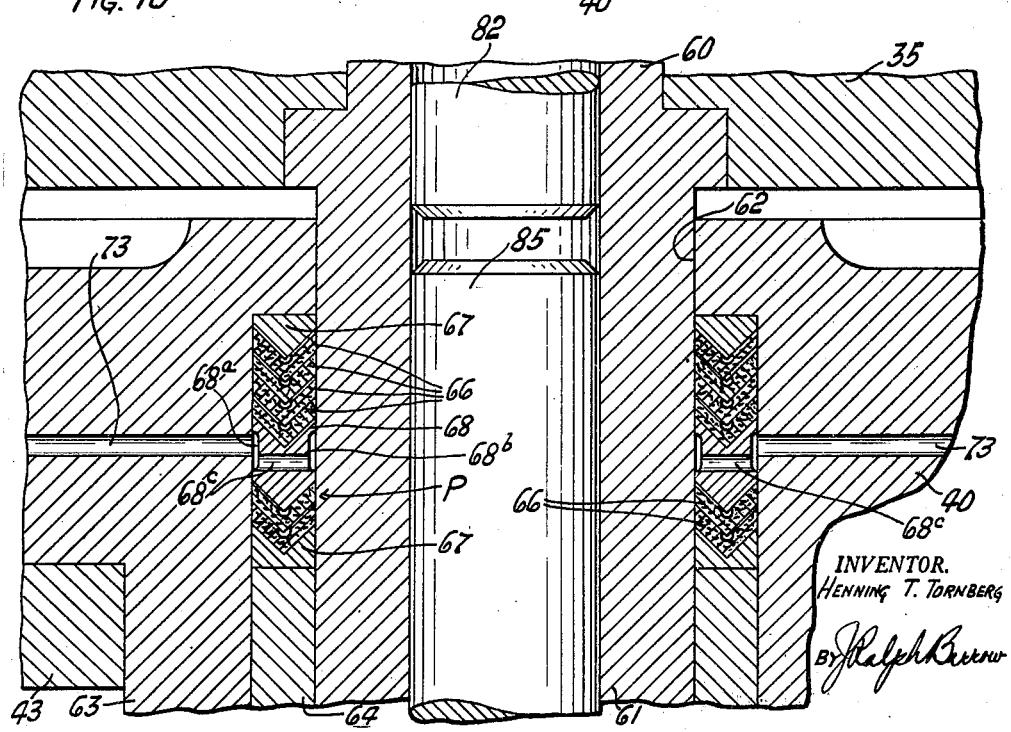
Figure 10 is a fragmentary cross-section, greatly enlarged, taken substantially on line 10—10 of Figure 9.

Referring particularly to Figures 5 and 10, a hollow stem or rod 60 is suitably fixedly received in a central opening through piston 35, a downward extension 61 of said stem being slidably received through a bore 62 in cylinder bottom plate 40. Bottom plate 40 has a boss 63 extending through an opening in the bottom of cup-shaped portion 43, in which boss is a bore for a packing gland 64 adjustable by means of screws 65, against packing P which may comprise two series of V-shaped packing rings 66, 66 between end adapter rings 67, 67 and a central metallic separator ring 68, the purpose of which will be described later. The packing P is provided to prevent leakage of pressure fluid between the cylinder and stem extension 61.

The top of piston 35 is provided with an annular flange 44, the bottom edge of which is engageable with the top edge portion of the wall 41 of the cylinder, when the piston is at the bottom of its stroke in the normal inoperative position thereof. A ring 46, secured to the top of platen 12, is provided with an annular shoulder portion 47 against which the top edge of flange 44 abuts for limiting upward movement of the piston. A suitable annular, self-expanding gasket 48 may be replaceably secured adjacent the bottom of the piston for engagement with the inner periphery of the cylinder, to prevent leakage of pressure fluid between the piston and the cylinder.

For operating both rams 36 simultaneously, pressure fluid, such as oil, is supplied to the bottom of cylinder 39 through piping 50, 50, connecting a valve 51, which is connected by piping 52 to a suitable source of pressure fluid supply (not shown). Valve 51 is controlled by two solenoids 53, 54 (see Figures 8 and 14) for actuating a lever 55 on the valve in opposite directions, either to permit passage of fluid to the cylinder through piping 52 and 50 to urge piston 35 of the ram upwardly, or to return the fluid to the source of supply through piping 50 and piping 57 to lower the piston 35. The solenoids 53, 54 are actuated in timed sequence with other operations during the cycle of operation of the press, as will be subsequently described in connection with wiring diagram.

As best illustrated in chain-dotted lines at H in Figure 8, the arrangement is such that when the press head 14 is in the fully closed position thereof, but with preformed unvulcanized articles W received within lower mold cavities and before pressure is applied to the pistons 35 of the hydraulic rams, there will be clearance between the registering faces of the upper and lower mold sections 13 and 15, to allow for the rough oversize of said performed articles, for example. The press may be maintained in this initial closed condition for a relatively short time to preheat and soften the rubber and further preform the article, the mold sections being continuously heated by means of heating plates 32 and 37. After this short preheating period the press motion is reversed an amount sufficient to widen the gap between the registering mold sections as shown in Figure 4, and immediately closed again to the first-mentioned closed position. This last named closing movement is effective to force or "bump" out from between the mold sections gases generated by certain chemicals in the rubber under the influence of heat. Upon closing the press this second time pressure fluid may be supplied to the hydraulic ram to urge piston 35 upwardly, thereby to apply heavy yielding pressure between the upper and lower mold sections. The piston is maintained in this condition during a curing cycle, as controlled by a timer mechanism to be described later, during which cycle the articles are formed under the influence of heat and pressure. At the end of the curing cycle, valve 51 is automatically actuated by the timer to return the pressure fluid in cylinder 39 to the source of pressure supply, through piping 50 and 57.

Figure 9:
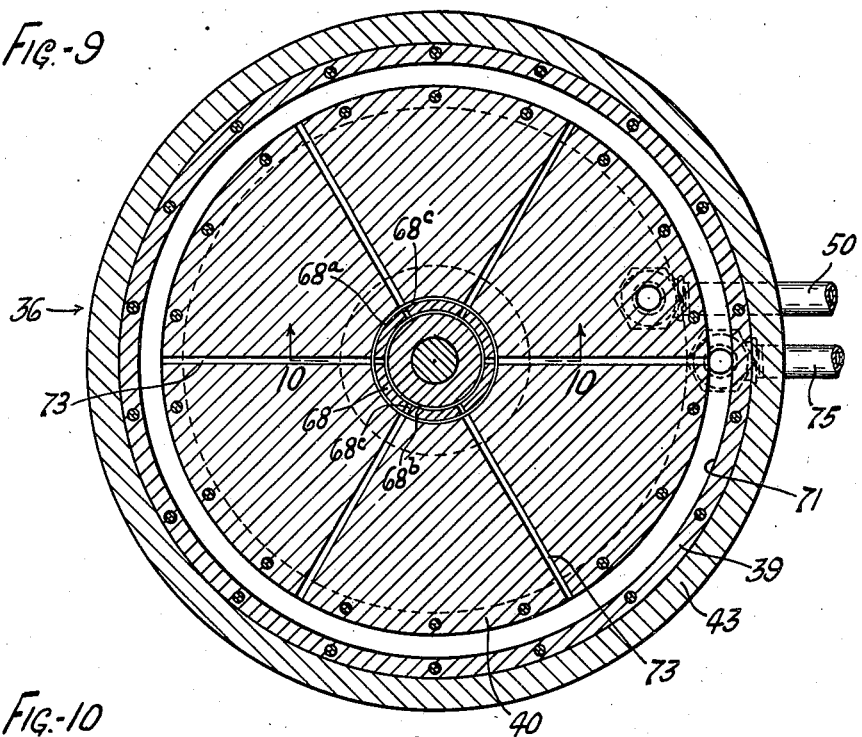
Figure 9 is an enlarged cross-section taken substantially on line 9—9 of Figure 5.

Because of the high pressure of the oil, or other pressure fluid, in ram 36 there is a tendency for much of the oil to be forced upwardly between the piston 35 and cylinder wall 41 and also downwardly past the stem extension 61. Oil-recovery means is provided herein to prevent loss of fluid in this manner, with consequent economy and efficiency of operation of the apparatus. As shown in Figures 5, 9 and 10, this recovery means may comprise an annular groove or chamber 70 in the cylinder wall 41, adjacent the top thereof, this groove communicating with an annular chamber 71 in the cylinder bottom plate 40, through a plurality of passages 72, 72 in said wall 41. Radially extending passages 73, 73 communicate chamber 71 with annular groove 68ª in the outer periphery of separating ring 68 which communicates with a similar groove 68ᵇ on the inner periphery thereof through a plurality of openings 68ᶜ. Piping 75 is connected to cylinder bottom plate 40 to communicate chamber 71 with said source of pressure oil supply. Groove 68ª is relatively wide so that it will cooperate with the openings 73 when the packing gland 65 is adjusted. The arrangement is such that oil escaping past the piston 35 or the stem extension 61 thereof will follow paths of least resistance, returning to chamber 71 and thence through piping 75 to the source of oil supply.

Referring particularly to Figures 4 to 8 of the drawings, means 76 is provided for centering the "green" steering wheels W in the lower mold cavity. The centering means 76 may comprise a head portion 77, secured or retained flush with the underside of lower mold section 13, said head having thereon a pin 78 adapted to be received through the usual central opening in the metallic core C about which raw rubber has been roughly preformed (see Figure 4). Pin 78 is tapered at its free end to be received in a tapered hole 79 in the upper mold section 15 when the mold sections are in full registering relation.

For automatically ejecting the finished product from the lower mold section during opening of the press, ejector mechanism, indicated generally at 80 (see Figures 4 to 8), may be provided. Vertically slidable in the upper portion of a bore 81 in sleeve 60 is a pin 82, in the upper end of which are a pair of prongs 83, 83 slidable through openings which extend through the centering means 76 in the lower mold section, to be engageable with a portion of core C of wheel W when pin or rod 82 is urged upwardly. A shoulder portion 84 on the upper end of pin 82 is normally seated in a recess in the upper end of sleeve or stem 60 to limit downward movement of said pin 82. Slidable in the lower portion of bore 81 in sleeve 60 may be a rod 85 the upper end of which is engageable with the lower end of rod 82, and in the lower end of which are oppositely disposed pins 86, 86 received in slots 87, 87 in the bifurcated end of an arm 88, which is pivotally mounted at 89 in a bracket 88ª on housing 10ª to swing in a vertical plane. A portion of arm 88 is engageable with the edge portion of a circular cam surface 90ª provided on a hub 90 on large driving gear 23, or 23ª as the case may be (see Figure 1), normally to limit downward movement of rod 85 in inoperative position.

For urging the rods 85 and 82 upwardly, to eject a finished article W from the lower mold section as the press is opening a cam arm 91 is pivoted on pivot 89 to swing vertically in parallelism with arm 88, the two arms being normally locked together by an electrically releasable latching device, indicated generally at 92. The underside of the free end of arm 91 is rounded upwardly for normally inoperatively resting or riding on cam surface 90ª of gear 23 in latched relation with the arm 88. The cam arm 91 is yieldingly maintained in contact with cam surface 90ª on hub 90 or with cam roller 93 by a spring-pressed pin 91ª in a housing 91ᵇ secured on the underside of the cup-shaped portion 43 of platen 12. During the opening movement of the press, a cam roller 93 on gear 23 is engageable with cam arm 91 to urge the latter and arm 88 latched thereto upwardly, arm 88 thereby urging rods 85 and 82 upwardly to eject a vulcanized article to the relative position with respect to the lower mold section shown in chain-dotted lines in Figure 8. In such position the article is readily removable from the press.

The latching device 92 is best shown in Figures 5, 8, 11, 12 and 13. A suitable cylindrical housing 95, fixedly received through an opening 96 in arm 88, is apertured at opposite ends for slidably receiving a latch 97 having a projecting portion 98 for engaging within a sleeve or bushing 99 in arm 91. Latch 97 has a collar or shoulder portion thereon for engaging the inner end face of the housing 95 to limit endwise movement of the latch toward arm 91 as yieldingly urged by a compression spring 101 between the collar and the other end face of the housing. The bushing 99 has a flanged portion 99ª against the inner face of arm 91, the exposed face of the flange being concave or dished for guiding the latch end 98 into the sleeve opening as urged by spring 101 (see Figures 12 and 13). When the press is operated toward the closed position shown in Figure 5, for example, arm 91 will be moved downwardly to a position in which latch portion 98 will be yieldingly urged into sleeve 99, as described above, to latch or lock arms 91 and 88 together in readiness for an article ejecting operation when the press is next operated toward fully open position, at which time cam roller 93 urges cam arm 91 upwardly as previously described.

In order properly to position a "green" or preformed article W in the lower mold section 13 when the press is in open position, after a previously finished article has been removed, it is necessary to withdraw the article engaging prongs 83 of ejector rod 82 from the lower mold cavity. For this purpose, between the arm 88 and a flanged portion 95ᵃ on cylinder 95 may be secured a collar 102 from the lower portion of which extends a pair of laterally spaced lugs 103, between which a crank 105 is pivoted at 104. An upwardly extending bifurcated arm 106 has slots in the upper ends of the bifurcated portions for receiving oppositely disposed trunnions 107, 107 on a block 108, which is retained on a reduced extension 109 of latch shaft 97 by a collar 110 secured on the end of the extension. Extending angularly of arm 106 on the crank may be an arm 112 the free end of which is pivotally connected by a pin 113 in the bifurcated upper end of a vertically extending rod 114, the lower end of which is connected to one end of a lever 115 which is pivoted to a bracket 116. The other end of lever 115 may be connected by a link 117 to the core 118 of a solenoid 119 mounted on said bracket. The pin 113 is slidable in slots 113ᵃ in said upper end of rod 114 to provide lost motion action to crank 105, so that the latch will not be tripped by the upward swinging movement of arms 88 and 91. The solenoid is electrically energized by the press operator pressing a button (not shown) when the press is open as described above to swing lever 115 as shown in chain-dotted lines in Figure 11, and through rod 114 and crank 105 to release latch end 98 from sleeve 99 and thereby disconnect arms 88 and 91. This allows arm 88 and rod 85 to drop by gravity until the arm rests on cam portion 90ᵃ of gear 23, which also allows ejector rod 82 to drop by gravity to its lowermost position to withdraw engaging prongs 83 thereon to inoperative position (see Figure 8).

The upper press member or head 14 may be formed with skirt portions 14ᶜ, 14ᶜ, which extend downwardly about the registering mold sections when the press is closed, to catch or trap the gases expelled from the mold. By suitable suction means (not shown) these gases are drawn into a chamber or chambers 14ᵃ in the head, through openings 14ᵇ in the bottom plate 31 of the head, and outwardly thereof through a suitable exhaust conduit 14ᵈ. Thus obnoxious gases generated by the vulcanizing process, are prevented from permeating the air about the press to injure the health of the press operators or otherwise cause discomfort.

The schematic wiring diagram shown in Figure 14 will now be described in connection with a brief description of the general operation of the press.

In the operation of the press, while the press is stopped in the open position shown in Figure 8, the operator seats a roughly preformed wheel W in the lower mold cavity, with centering pin 79 received through the central opening of the wheel. In this position of the press the ejector arms 88 and 91 will be disconnected. The operator momentarily presses a "close" button on the press, which closes a circuit, through a "stop" button and a transformer 120 connected across power lines $L_1$, $L_3$, to energize a coil 121 which throws closing switches C connected to power lines $L_1$, $L_2$, $L_3$ to start the press motor 26. This, through pinions 24, drives large gears 23, 23ᵃ to turn cranks 19 in clockwise direction (see chain-dotted lines in Figure 3), whereby the side arms 17 carry the press head 14 toward the closed position thereof shown in full lines in Figure 3, the cam plates 27 on opposite ends of head 14 and the pairs of rollers 29 on the fixed lower press member 10 engaging in the cam slots 28 causing the head to move in parallelism toward an initial or intermediate closed position of the press, in which arms 17 are on dead center and the registering faces of the upper and lower mold sections are in slightly spaced relation to allow for oversize of the preformed wheel W in the lower mold cavity (see also chain-dotted position of mold section 15 in Figure 8). In this position of the press the piston 35 of the hydraulic ram 36 remains in the down position shown in Figure 8.

In the meantime, the operator having momentarily pressed the "close" button (Figure 14) a secondary press-closing circuit was established through normally closed contacts $a$—$b$ of press limit switch $LS_1$ (Figure 2) by the coil 121 operating a holding relay HC, the purpose of which is to hold switches C closed to keep motor 26 running after the "close" button is released. The contacts $a$—$b$ of $LS_1$ are open only when the press is stopped in closed position.

When the press has operated to the initial closed position described above (Figure 3) a cam 122 on driven gear 23ᵃ will operate switch $LS_1$ to open contacts $a$—$b$, de-energizing coil 121 and holding relay HC to stop the press operating motor 26, but at the same time closing a timer circuit from transformer 120, across contacts $a$—$c$ of $LS_1$ to start a timer motor T, which, by means of cams $C_1$, $C_2$, $C_3$, $C_4$, and $C_5$ operating a series of switches $S_1$, $S_2$, $S_3$, $S_4$ and $S_5$, respectively, starts a series of article-forming operations of the press. The timer mechanism may be of suitable type readily obtainable on the market.

All of these timer operated switches are normally closed except switch $S_2$. First, cam $C_3$ momentarily closes switch $S_3$, the latter switch closing a circuit from transformer 120, through the "stop" button and contacts $a$—$c$ of press limit switch $LS_1$, to energize coil 123 which closes reversing switches R connecting power lines $L_1$, $L_2$ and $L_3$ with motor 26, to hold the same in reverse only long enough to operate side arms 17 to widen the gap between the mold sections 13 and 15, substantially as illustrated in Figure 4. This gap is immediately narrowed to the original closed positions of the mold sections (Figure 8) by operation timer cam $C_4$ to close switch $S_4$, thereby closing a circuit from transformer 120 through the "stop" button, contacts $a$—$b$ of press limit switch $LS_1$ (which momentarily closed when the press motor was momentarily reversed), to energize coil 121 to start motor 26. Cam $C_4$ will open switch $S_4$ simultaneously with said opening of contacts $a$—$b$. The motor, of course, is stopped again when the press is closed by limit switch $LS_1$ opening contacts $a$—$b$.

This aforementioned partial opening and closing of the press may be termed a "bumping" action, which is effective to force from between the mold sections the gases generated from certain pigments in hard rubber or similar plastic compositions used in the manufacture of steering wheels or the like. These gases are prevented from permeating the air about the press by being drawn into the chamber 14ᵃ in head 14 and carried away through exhaust conduit 14ᵈ, by the suction means (not shown).

After said "bumping" operation timer cam $C_5$ may be operable to close contacts $d$—$e$ of a switch $S_5$, to energize a solenoid 54 in a circuit through press closed contacts $a$—$c$ and the "stop" button, and thereby operate valve 51 (Figure 8) to supply pressure fluid from pressureoil supply piping 52, through piping 50 to the rams 36. This urges piston 35 upwardly to apply heavy hydraulic force between the upper and lower mold sections 13 and 15 and thereby form the article W, as best shown in Figures 1 and 5, under the influence of continuous vulcanizing heat conducted to the mold sections from the heating plates 32 and 37. The initial closing movement of the press is effective to preheat and soften the rubber of the "green" article W, while the ram applies the requisite high pressure to the mold sections for forming the article. The nature of the rams are such that the respective lower mold sections will be moved into self-centering firm engagement with their upper mold sections. This self-centering action particularly is made possible by the provision of the oil recovery system in the cylinder 39, as previously described.

At the end of the curing cycle cam $C_5$ opens contacts $d$—$e$ and closes contacts $d$—$f$ of switch $S_5$ (Figure 14) to de-energize coil 54 and energize coil 53 in the same circuit. This operates valve 51 to return the pressure oil from rams 36, to the source of supply, through piping 50 and return piping 57, thereby causing pistons 35 to lower. When the hydraulic pressure is thus released cam $C_5$ moves switch $S_5$ to the inoperative position thereof.

Figure 2:
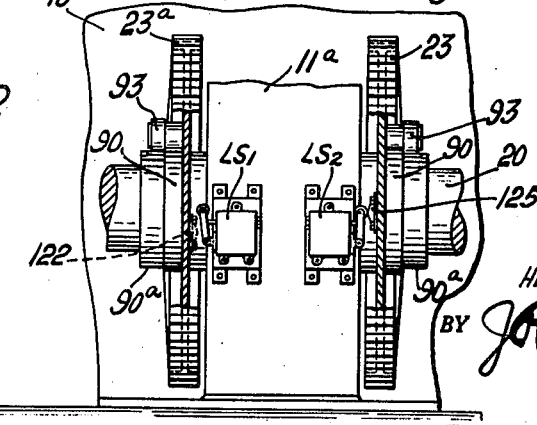
Figure 2 is a fragmentary view, partly broken away and in section, at the front of the press at the lower central portion thereof and taken inside the outer casing, illustrating the press limit switches in open position of the press.

Simultaneously with or subsequent to full release of the hydraulic pressure, timer cam $C_3$ momentarily closes switch $S_3$ to energize coil 123 to start motor 26 in reverse as before, at the same time closing a press motor holding switch HR in a press opening circuit, through press limit switch $LS_2$ and normally closed timer switch $S_2$, to keep coil 123 energized and hence keep the motor 26 operating in reverse until said motor is stopped in the fully open position of the press, by cam 125 on large driven gear 23 operating limit switch $LS_2$ (Figure 2). After the press has reached the fully open position shown in Figure 8 the timer motor T will be stopped by cam $C_1$ opening switch $S_1$ and the various parts of the electrical circuit will be set as shown in Figure 14 for a succeeding curing cycle as described above.

The press may be stopped at any point during the opening or closing of the same, by pressing the "stop" button (Figure 14) to open the primary circuit connected to the transformer 120, thereby de-energizing either coil 121 or coil 123 to stop press motor 26. The press may be reversed while closing by pressing an "open" button in a circuit between the press-closing holding circuit and press-opening holding circuit.

Upon the press operating to the fully open position shown in Figure 8 the cam rollers on the driven gears 23 and 23$^a$ will have urged the respective sets of cam arms 91 and arms 88 to the raised positions thereof, arms 91 and 88 being latched together by the latching device 92. Raising arm 88 shifts rods 85 and 82 upwardly to engage the ends of prongs 83 with the core C of wheel W, thereby projecting the latter upwardly to a position where it is readily removable from the lower mold section (see chain-dotted position of wheel W in Figure 8). Once the finished article is removed the operator may operate a switch (not shown) momentarily to energize coil 119 (Figures 8 to 11), and thereby release latch end 88 from the catch or sleeve 89 of cam arm 91. This permits arm 88 to drop by gravity and thereby permit rod 82 also to drop by gravity to withdraw the prongs 83 thereof so that the operator may freely place another preformed article W in the lower mold cavity for the next succeeding curing cycle of the press, arms 88 and 91 being mechanically latched together upon relatively moving into latching alignment with each other (Figure 12) when the press is again closed.

Thus has been briefly described a vulcanizing press which is capable of effectively and efficiently accomplishing the stated objects of the invention. Modifications of the invention may be resorted to without departing from the spirit thereof or the scope of the appended claims.

What is claimed is:

1. An article-forming press of the class described comprising a relatively fixed mold member and a relatively movable mold member for registry therewith, power means for moving said movable member toward and from registry with said fixed member, article ejecting means in association with said fixed mold member, a first element shiftable to operate said ejecting means for ejecting an article, a second element adapted to shift with said first element and independently thereof, releasable means for locking said first and second elements together when closing the mold to be shiftable as a unit, means operable by said power means during opening of the mold to shift said second element and through said locking means to shift said first element to operate said ejecting means for stripping an article from said fixed mold member, and means operable at will to release said locking means and thereby render said ejecting means inoperative.

2. An article-forming press of the class described comprising a relatively fixed mold member and a relatively movable mold member for registry therewith, power means for moving said movable member toward and from registry with said fixed member, article ejecting means in association with said fixed mold member, a first element shiftable to operate said ejecting means for jecting an article, a second element adapted to shift with said first element and independently thereof, releasable means for locking said first and second elements together when closing the mold to be shiftable as a unit, means operable by said power means during opening of the mold to shift said second element and through said locking means to shift said first element to operate said ejecting means for stripping an article from said fixed mold member, and means operable at will to release said locking means and thereby render said ejecting means inoperative, said locking means comprising a spring-pressed latch on one of said elements and a recessed portion on the other element for receiving said latch, said latch and recessed portion having cooperating guide surfaces whereby said latch will be automatically guided into said recessed portion when said elements are relatively moved into association with each other upon closing the mold.

HENNING T. TORNBERG.